US007695613B2

(12) United States Patent
Doyle et al.

(10) Patent No.: US 7,695,613 B2
(45) Date of Patent: Apr. 13, 2010

(54) INLINE CHLORINATOR WITH INTEGRAL CONTROL PACKAGE AND HEAT DISSIPATION

(75) Inventors: Kevin Doyle, Delray Beach, FL (US); Keith Schulte, Coconut Creek, FL (US); Bruce Johnson, Deerfield Beach, FL (US)

(73) Assignee: KBK Technologies, Inc., Deerfield Beach, FL (US)

( * ) Notice: Subject to any disclaimer, the term of this patent is extended or adjusted under 35 U.S.C. 154(b) by 853 days.

(21) Appl. No.: 11/258,136

(22) Filed: Oct. 26, 2005

(65) Prior Publication Data

US 2006/0169647 A1 Aug. 3, 2006

Related U.S. Application Data

(60) Provisional application No. 60/621,806, filed on Oct. 26, 2004.

(51) Int. Cl.
*B01D 17/12* (2006.01)
(52) U.S. Cl. ............ 210/85; 62/259.2; 204/228.1; 204/228.3; 210/87; 210/96.1; 210/138; 210/143; 210/149; 210/167.11; 210/192; 210/205; 422/255; 340/660; 361/702; 361/709
(58) Field of Classification Search .......... 210/85, 210/87, 96.1, 103, 138, 141, 143, 167.1, 210/167.11, 167.12, 739, 746, 754, 764, 210/243, 192, 205, 206, 760, 149; 204/228.1, 204/228.3, 228.6, 229.4, 229.6, 229.8, 230.2, 204/230.8, 237, 239, 554–556; 62/259.1, 62/259.2, 505, 3.2–3.6, 55.5; 361/688, 702, 361/704, 705, 709, 720; 222/146.6; 257/676; 700/65; 422/255; 340/660, 661
See application file for complete search history.

(56) References Cited

U.S. PATENT DOCUMENTS

| 3,351,542 | A | * | 11/1967 | Oldershaw et al. .......... 210/748 |
|---|---|---|---|---|
| 3,867,290 | A | | 2/1975 | Mackey |
| 3,924,808 | A | | 12/1975 | Cooley, Jr. |
| 4,002,293 | A | | 1/1977 | Simmons |
| 4,085,028 | A | | 4/1978 | McCallum |
| 4,100,052 | A | | 7/1978 | Stillman |
| 4,136,005 | A | | 1/1979 | Persson et al. |
| 4,244,802 | A | | 1/1981 | Pohto et al. |
| 4,255,246 | A | | 3/1981 | Davis et al. |
| 4,265,402 | A | | 5/1981 | Tsai |
| 4,472,256 | A | | 9/1984 | Hilbig |
| 4,500,404 | A | | 2/1985 | Tucker |
| 4,599,159 | A | | 7/1986 | Hilbig |

(Continued)

FOREIGN PATENT DOCUMENTS

EP 0590762 4/1992

OTHER PUBLICATIONS

Solartrope Supply Corporation, Aquar Rite—Chlorinator, http://www.solartrope.com/new/chlorinator.htm.
Chloromatic Slat Water Pool Systems, Owners Manual, Model CNR and ECO-CHLOR/CNSC Series.

*Primary Examiner*—Joseph W Drodge
(74) *Attorney, Agent, or Firm*—Tangent Law Group, PLLC; Eric J. Weierstall, esq.

(57) ABSTRACT

The invention is directed to a chlorinator mounted inline in a water purification system having a housing having an inlet end and an outlet end and an upper compartment having an electronics section with a controller unit contained within the electronics section and in electrical communication with a power source and an at least one electrolytic plate. The system having a heat sink member in thermal communication with the controller, wherein the flow of the water in the water purification system cools the heat sink member and the controller unit.

23 Claims, 6 Drawing Sheets

U.S. PATENT DOCUMENTS

| | | | |
|---|---|---|---|
| 4,714,534 A | 12/1987 | Fair et al. | |
| 4,861,451 A | 8/1989 | David | |
| 4,889,283 A | 12/1989 | Fuller et al. | |
| 4,923,618 A | 5/1990 | Casberg et al. | |
| 4,955,540 A | 9/1990 | Fuller et al. | |
| 4,992,156 A | 2/1991 | Silveri | |
| 5,078,320 A | 1/1992 | Fuller et al. | |
| 5,124,032 A | 6/1992 | Newhard | |
| 5,221,444 A | 6/1993 | Silveri | |
| 5,427,658 A | 6/1995 | Allen | |
| 5,439,170 A | 8/1995 | Dach | |
| 5,468,360 A | 11/1995 | David et al. | |
| 5,541,363 A | 7/1996 | Weise et al. | |
| 5,687,575 A * | 11/1997 | Keville | 62/55.5 |
| 5,802,750 A | 9/1998 | Fulmer | |
| 5,807,473 A | 9/1998 | Sadler et al. | |
| 5,979,791 A | 11/1999 | Kuykendal | |
| 5,993,669 A | 11/1999 | Fulmer | |
| 6,076,741 A | 6/2000 | Dandrel et al. | |
| 6,238,555 B1 | 5/2001 | Silveri et al. | |
| 6,276,612 B1 | 8/2001 | Hall | |
| 6,309,538 B1 | 10/2001 | Khan | |
| 6,391,167 B1 | 5/2002 | Grannersberger | |
| 6,427,927 B1 | 8/2002 | Hall | |
| 6,611,114 B1 | 8/2003 | Yen | |
| 6,625,824 B1 | 9/2003 | Lutz et al. | |
| 6,656,353 B2 | 12/2003 | Kilawee et al. | |
| 6,717,383 B1 | 4/2004 | Brunt et al. | |
| 7,061,080 B2 * | 6/2006 | Jeun et al. | 257/676 |
| 7,114,637 B2 * | 10/2006 | Davis | 222/146.6 |
| 7,238,278 B2 * | 7/2007 | Coffey et al. | 210/94 |
| 2002/0035403 A1 * | 3/2002 | Clark et al. | 700/65 |
| 2003/0024809 A1 | 2/2003 | Broembsen | |
| 2006/0027463 A1 * | 2/2006 | Lavelle et al. | 205/556 |

* cited by examiner

INLINE CHLORINATOR WITH INTEGRAL CONTROL PACKAGE AND HEAT DISSIPATION

PRIORITY DATA

This application claims benefit of earlier filed U.S. Provisional Patent Application Ser. No. 60/621,806 entitled "Inline Chlorinator with Integral Control Package and Heat Dissipation" filed on Oct. 26, 2004, and is herein incorporated by reference.

TECHNICAL FIELD

The present invention relates generally to water purification and, in an exemplary embodiment, to a chlorine generator, which produces unexpected benefits of increased reliability, decreased maintenance costs, and improved water purification through an inline chlorination device with an integral controller, a heat sink member, and a power source connector for easy maintenance and replacement.

BACKGROUND OF THE INVENTION

There are various methods of disinfecting water supplies. For instance, some systems use chlorine dioxide, which is unstable and may produce undesirable byproducts such as chlorates. Similarly, ozone can be used. However, ozone is an unstable chemical and breaks down rapidly as does UV radiation (ultra violet light) from UV treatment systems. Additionally, neither of these systems leaves a residual disinfectant in the water supply. Thus, chlorine is one of the most widely used and adopted methods of sanitizing water.

Chlorine is the most widely used method of neutralizing disease causing pathogens and bacteria in a body of water. Although there are other means of neutralizing bacteria and pathogens, chlorine is the disinfectant of choice for many reasons. Chlorine kills pathogenic organisms efficiently and effectively by attacking the cell or the cell enzyme system. In either case, the inactivation of the pathogenic organisms is achieved. The chlorine residual HOCL is a longer lasting residual that effectively kills pathogens until dissipated. EPA requirements for potable or public water facilities and state requirements for chlorine levels are as follows: 0.2 mg/L-0.5 mg/L free chlorine residual. As such, safe levels of chlorine can be maintained to eradicate any bacteria or pathogens in the water without risk to public safety.

However, even though chlorine is relatively inexpensive and safe as compared to other types of sanitizers, the cost of chlorine in tablet and liquid systems, like those used to typically sanitize a pool, becomes an extremely expensive proposition over the lifetime of the pool. Moreover, significant hazards, time, labor, and other costs are associated with storing and handling toxic chlorine and/or other hazardous chemicals such as chlorine tablets, oxidizers, algaecides or algae inhibitors.

Another problem with the use of tablet and liquid based chlorine systems, like that shown in U.S. Pat. No. 6,656,353 is the need to stabilize the chlorine such that it remains in the water, as UV rays tend to deplete or damage chlorine molecules during the day. Typically, this is accomplished in a tablet system by the addition of cyanuric acid or similar stabilizing agents. However, these agents can build up to undesirable levels which can present a health problem and cause damage to pool plaster and can require draining the body of water and adding fresh water to reduce concentrations.

Several attempts have been made to utilize chlorine or ion producing generators to treat water. However, besides the problems already mentioned above, such devices tend to have significant reliability problems and/or require complex chemical production and containment requirements. Moreover, such systems tend to require a professional to install and maintain resulting in expensive installation and maintenance costs. This is especially true of the heretofore known systems.

Systems such as those in U.S. Pat. Nos. 4,136,005 to Persson et al.; 4,255,246 to Davis et al.; 4,472,256 to Hilbig; 5,427,658 to Allen; 5,468,360 to David et al. and 5,807,473, to Sadler et al. typically utilize significant amounts of electricity and generate significant amounts of heat during operation. Some of these systems have even included heating elements within the system, such as in U.S. Pat. No. 4,599,159, which shows an electrolytic pool chlorinator with a resistive heater, adding heat into the system around the electrolytic units. This results in the locating of controls and electronics, which are negatively affected by the increased operating temperatures, remotely from the chlorinator.

This increases the complexity in these existing devices, as electrical connections must extend from the chlorinator to the controller and back to the chlorinator to properly function. Generally, electrical systems, especially complex systems with multiple connections, in close proximity with salt water can be dangerous in and of themselves and may tend to cause accidental electrical shock hazards under some conditions. This is coupled with the fact that these systems are also subject to electrical shorting in the normal course of operation, which causes breakdowns, an absence of chlorination during the breakdowns, repair expenses, and other problems.

These chlorinators work to the extent that they do satisfactorily treat the water, but they have serious drawbacks. Essentially, they have very limited lifespans without maintenance and are thus both inconvenient and expensive to maintain in full working order. If the chlorinator elements should fail, in the heretofore known complex designs a professional installer is often called upon to repair or reinstall the chlorinator and reconnect the system. This results in downtime and potentially significant additional costs for these systems and inconvenience, in the case of pool systems, for the pool owner.

In an attempt to provide easier maintenance access for these professionals, various inline embodiments of these systems have been provided. For instance, U.S. Pat. Nos. 4,085, 028 to McCallum; 4,100,052 to Stillman; 4,714,534 to Fair et al.; and 4,861,451 to David; and U.S. application 2003/0024809 to Broembsen disclose inline chlorinator systems that begin in the simplification of the design, consolidating the working components of the chlorinator in an inline design at an input line for the pool. However, in each of the instances, several electrical connections are required to make the system functional and the systems are therefore still difficult to maintain for the average pool owner.

U.S. Pat. No. 6,391,167 attempted to address this issue, by providing an easily removable two-part housing. The chlorinator comprises a housing having in-line inlet and outlet openings and a removable cover. An input bridge is provided which is designed to provide overvoltage and surge protection, as well as low-loss input rectification to keep heat generation low. However, the controller for the system, including the sensor element, must still be located remotely from the system and requires that several electrical connections be made before the system is functional. All of these designs still require connection to a master controller located remotely from the electrolysis package.

The significant maintenance, repair and operation costs involved with such systems can be disappointing to pool owners who were led to believe their system would reduce costs by eliminating the need to purchase chlorine. None of these systems to date has been able to locate all the mechanical and electrical components in one easy to use and easy to replace "plug and play", in-line package incorporating both the electrolytic components used for generating the chlorine and the control and power management components in a single housing together with a heat dissipation system to protect these electrical elements.

The prior art discussed above does not provide a long life, low maintenance, purification system that is an extremely effective purifying water and which incorporates its controller in situ on the inline device and, in a preferred embodiment, and utilizes a heat sink element to help cool the electronics. Consequently, there remains a need to provide a highly reliable, easy to use and install water purification apparatus. Those of skill in the art will appreciate the present invention, which addresses the above and other problems and long felt needs.

SUMMARY OF THE INVENTION

An object of the invention is to provide an inline chlorinator unit that is user friendly and easy to maintain for the owner, requiring few if any special service calls by a professional for repair and replacement.

An object of the invention is to a more reliable, robust inline chlorinator with enhanced controls and an enhanced and improved user interface features.

Another object of the instant invention is to provide an apparatus and method whereby the controller and blades are incorporated into one simple enclosure.

A still further object of the instant invention is to provide an apparatus and method in a single enclosure to cool the controller by using the inline water.

A yet further object of the instant invention is to provide an apparatus and method to cool a secondary enclosure using inline water.

A still further object of the invention is to provide an apparatus and method to extract system data obtained during system operations from an inline chlorinator, including use of a network or optical data storage system.

The apparatus of the invention includes a chlorinator mounted inline in a water purification system, having a housing with an inlet end and an outlet end and an upper compartment having an electronics section, a controller unit contained within the electronics section and the controller unit being electrically coupled to a power source and an at least one electrolytic plate. The chlorinator also includes a heat sink member that is in thermal communication with the controller, where the flow of the water in the water purification system cools the heat sink member and the controller unit.

The controller unit can further comprise a microprocessor controller. The inline chlorinator can further comprise an at least one sensor in communication with the microprocessor controller. The at least one sensor can further comprise a flow sensor. The flow sensor is mounted within the chlorinator. The at least one sensor can also further comprise an electric potential sensor. The electrical potential sensor can measure the electrical potential across the at least one electrolytic plate and communicate the result to the controller unit. Upon detection of a threshold electrical potential input from the at least one electrical potential sensor, a voltage reversing circuit can be engaged and the polarity of the plates reversed to reduce buildup.

The electronics section can be filled with a waterproof potting material without interrupting the thermal or electrical communication with the controller unit. The waterproof potting material can be a two-part epoxy. The controller unit can further comprise a printed circuit board and a microprocessor controller.

The controller unit can further comprise an at least one of an at least one LED and an at least one user interfaceable switch. The controller unit can further comprise an at least one of an at least one network interface and a data media. The at least one network interface and a data media can store or store and transmit data from the sensors.

The can also have the controller track and store system operating parameters and historic data, including an at least one of the hours of use, the hours in each of a plurality of settings, the hours at various system conditions, and the number of self-clean cycles. The operating parameters and historic data can be transferred out of the controller into a storage medium using an at least one of a hand-held optical transmission device, a wired communication device, and a wirelessly connected device. A means to transfer historic data from the chlorinator to a storage media or a display device through at least one of an optical transmission, wired, wireless, RF, and magnetic mechanism can also be provided. The heat sink can further comprise a heat transmissive epoxy that also further acts as the potting epoxy. The heat sink can be in direct contact with the water flowing through the inlet. The heat sink can be in close proximity to the inflow water.

The heat sink can be separated by a separation section being continually cooled by the water flowing in through the inlet of the housing. The separation section can be a section comprising a concomitant wall of the electronics compartment and a wall of the housing in direct contact with the water flowing in through the inlet of the housing. The controller can be a stand-alone controller incorporated in a unitary, sealed housing. The stand-alone controller can report to and be further controlled by a master controller. The inline chlorinator can also further comprise a user interface panel, wherein the at least one LED further comprises a plurality of LEDs as a part of the user interface, the user interface indicating a condition of the inline chlorinator.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1A:
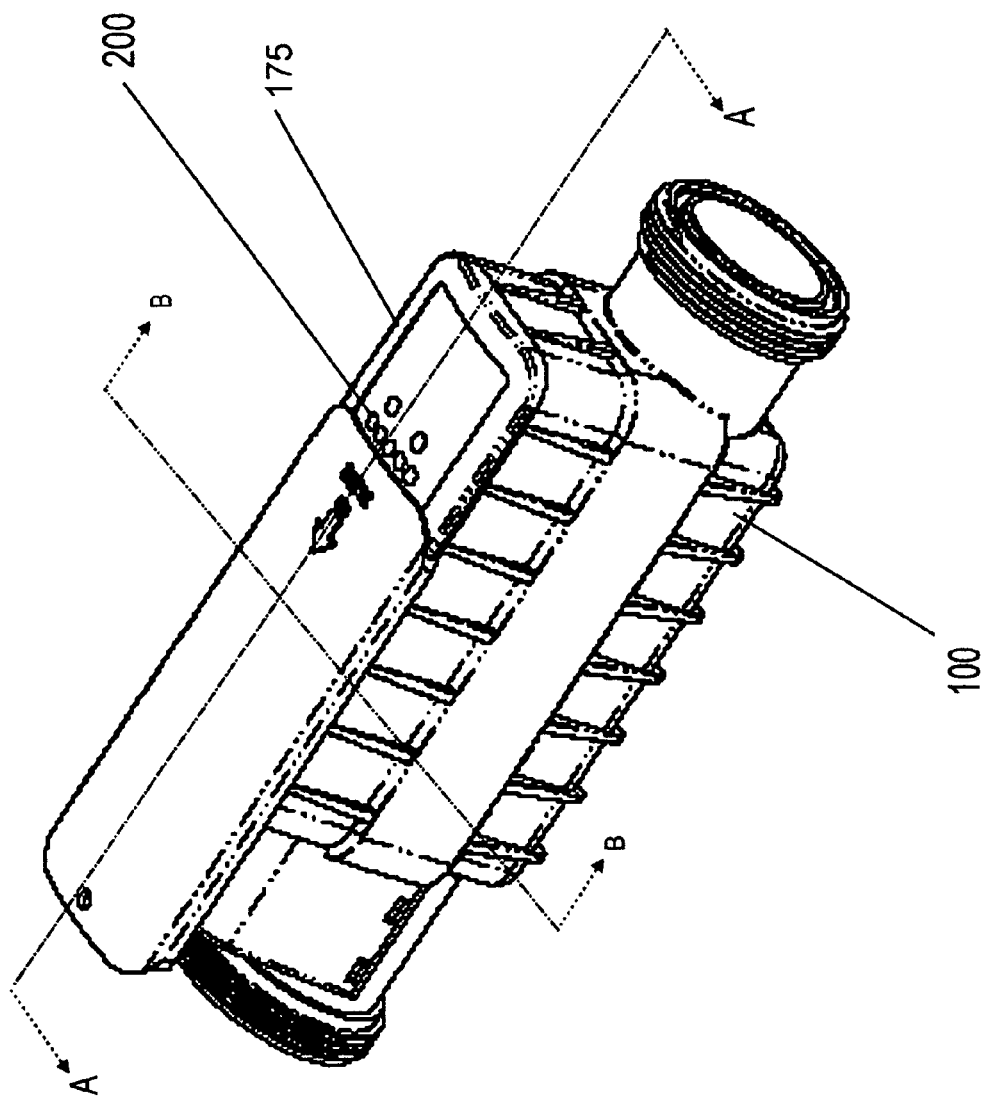
FIG. 1A illustrates a perspective view of an exemplary embodiment of the invention.
Figure 1B:
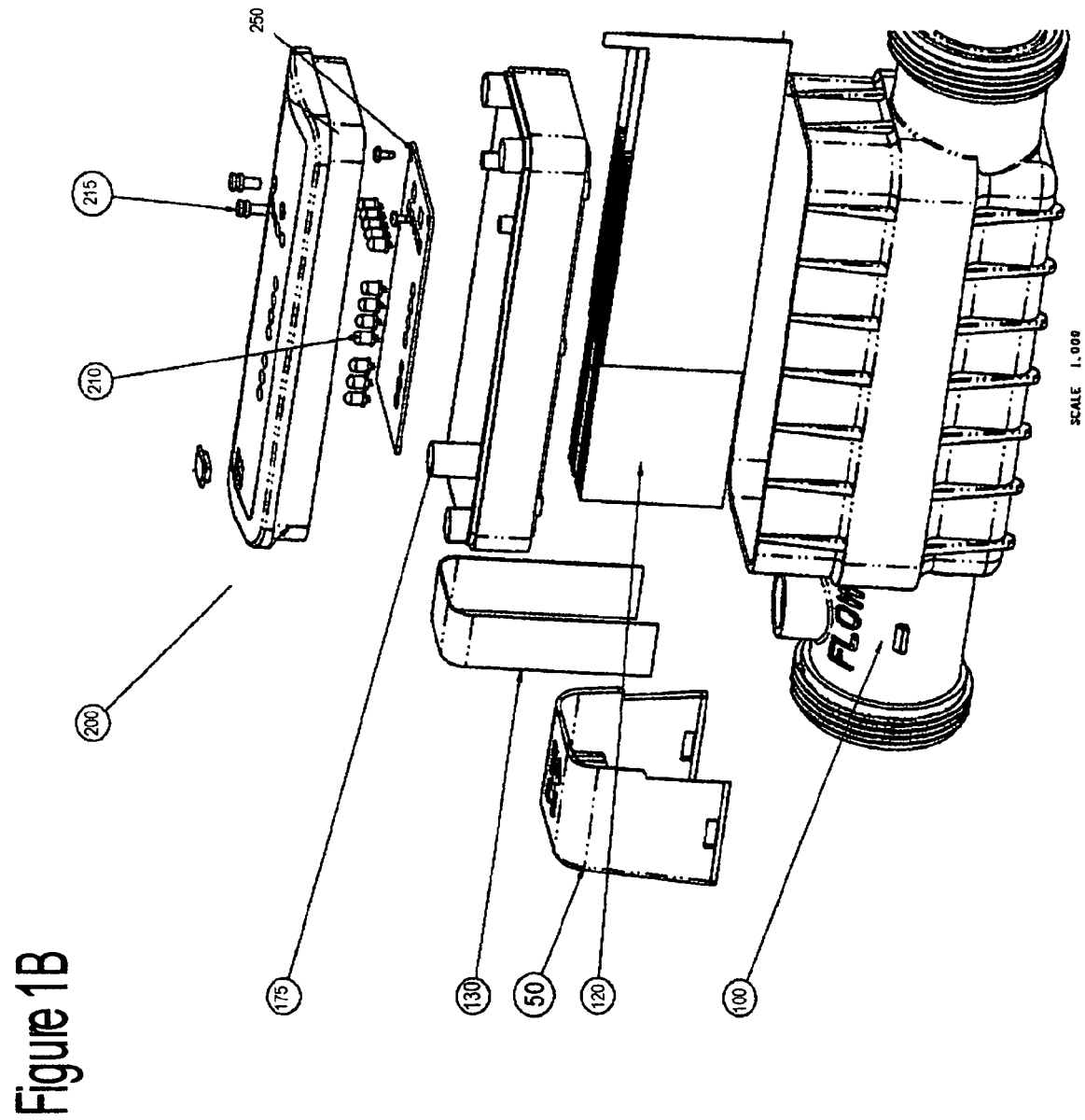
FIG. 1B illustrates an exploded view of the exemplary embodiment of FIG. 1A.

FIG. 1A shows an isometric view of an exemplary embodiment of the instant invention and FIG. 1B illustrates an exploded view of the exemplary embodiment of FIG. 1A. The system is designed to be put inline with a water input line. The chlorinator has a housing 100. The housing may be comprised of any suitable material and is a unitary housing in the exemplary embodiment. This material may be, for instance, but is not limited to a heavy-duty plastic or any suitable material which has sufficient durability in the highly chlorinated environment.

The housing 100 has an inflow or input side 150 wherein water flows into the chlorinator. A flow switch 50 is included with a cover. The water passes through the housing and through a series of electrolytic plates 120. The electrolytic plates 120 are typically matched sets of anode and cathode plates comprising copper or other suitable materials to provide an electrical current sufficient to separate the chlorine from a sodium molecule to provide chlorination. The process of electrolytic chlorination in this fashion is well known in the art.

Coupled to and controlling the electrolytic plates is a controller unit 200 which can include an at least one of a controller 240, an at least one LED 210, a printed circuit board 250, a coupling to an at least one sensor 310 and similar analog and digital electronic components and couplings. The controller unit 200 is electrically coupled to the electrolytic plates 120, the at least one sensor input 310 and to a power source (not shown). The power source is the only external coupling 800 in the exemplary embodiment shown. This minimizes the necessary electrical connections and, to further ease installation, the coupling 800 with the power source can utilize a simple plug or similar connector to connect the system. This obviates the need for a professional repairperson to do maintenance and replacement of the system if the chlorinator should break down as the installation is significantly simplified. In the exemplary embodiment shown, this is the only electrical connection necessary, although additional connections may be provided for communication of the chlorinator controller with other controllers or output or storage devices, as described herein. The controller 240, for instance, may be in communication with, but is certainly not limited to communications with, a pump controller and/or a heater unit controller in further exemplary embodiments.

In the exemplary embodiment shown, an at least one sensor 310 may be provided. The at least one sensor 310 may comprise an at least one flow sensor to detect when water is being pumped through the device and it in turn can communicate with the controller 240. With the at least one sensor 310 mounted in the device, it can detect when the pump is operational. This in turn triggers the controller 240 to engage the electrolytic plates 120 to chlorinate the water. In further embodiments, this may also be facilitated by a second connection to a controller or flow sensor for the pump (not shown).

Additionally, the at least one sensor 310, may include, alone or in combination, any of the aforementioned sensors, including amperage or voltage sensors to detect and/or monitor when the plates 120 are fouled by scale or buildup and sensors to measure the energy being consumed by the chlorinator. The output of these sensors may trigger indicators, such as the at least one LED 210, to indicate when the plates need replacement and/or the degree to which the plates are operating. In such instances, the system may also utilize a voltage reversing technique to reduce the buildup, as determined by controller 240. Additional sensors may also be added to regulate and record the amount of chlorine in the water, the ph level of the water, the temperature of the water, and other parameters of interest in water treatment.

The controller unit 200 is also capable of storing and reporting data on systems operation. Parameters such as energy used, voltages, time in service, time in particular operating states, historic data, cleaning cycles, and similar operational variables can be measured, stored and monitored through the controller unit 200. The results of these measurements can be reported via a data medium, a network (wired or wireless), or through any appropriate data transmission and/or storage paradigm. A "data medium" refers to any storage device used for storing data accessible by a computer or other data processing device. Examples of a data medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a terrestrial or wireless network. A "network" refers to any number of computers and associated devices that are connected by communication elements. A network can involve permanent connections such as cables or temporary connections such as those made through telephone or other communication links. Examples of a network include: an internet, such as the Internet; an intranet; a local area network (LAN); a wide area network (WAN); Wireless Access Protocol networks (WAP); Bluetooth™ and similarly enabled Personal Area Networks (PANs) and any combination of networks, such as an internet and an intranet.

To this end, the controller may include an at least one of an at least one optical storage device, an at least one network bus, an at least one wireless transceiver and other addressable devices to transmit and/or store data accordingly. Extraction of the data can be accomplished by accessing the data media through a suitable mechanism, either direct physical access, such as removing a memory card, or via a network, either through an external network jack or wirelessly, to extract the desired data.

Figure 2:
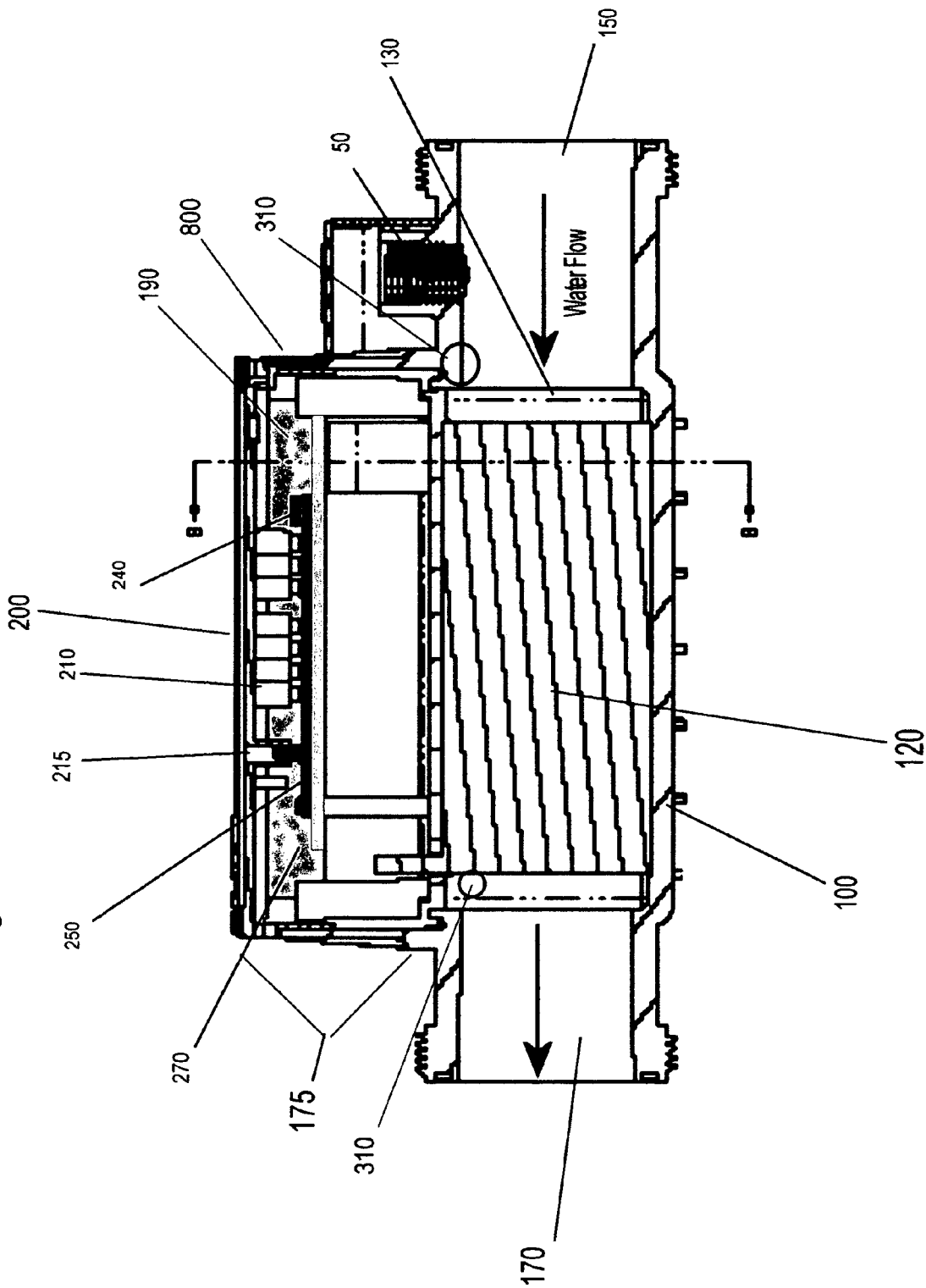
FIG. 2 illustrates a cross sectional view of the exemplary embodiment of FIG. 1A along line A-A.

The components of the controller unit 200 are contained within an electronics section 190 within the upper compartment 175 portion of housing 100. The controller unit 200, once in place within the upper compartment 175, is potted with a waterproofing compound 270, for example a two-part epoxy, as shown in FIG. 2. Once the waterproofing compound 270 sets, it will provide waterproofing and secure the controller unit 200 components in the electronics section 190 of the upper compartment 175. This fixing process also provides for improved longevity and reliability in the electronics.

The electrolytic process producing the chlorine occurs at the plates 120 and requires a significant amount of electrical energy. The admission of the energy and the process itself produces a significant amount of heat, which is harmful to electronics. Therefore, to mitigate the heat, on the inflow side of the water a heat sink member 130 is provided. Heat sink member 130 is, in an exemplary embodiment, a highly thermally conductive material with low electrical conductivity. The heat sink member 130 is in thermal communication with the potted controller unit 200 such that it can cool the package. This thermal communication may be facilitated prior to admission of the waterproof potting compound 270, such that the waterproof potting compound fixes the heat sink member 130 in waterproof thermal communication with the controller unit 200.

Thus, as the water passes through the instant invention, the motion of the water can be detected, electrolytic conversion of salt can be performed to chlorinate the water while the controller unit 200 and the upper compartment 175 are simultaneously cooled by the heat sink member 130. The chlorinated water can then be passed to the outflow or outlet 170. The unitary housing 100, with its controller unit 200 and its electrically coupled electrolytic plates 120, is easily removed for replacement with only a simple, single electric coupling 800 requiring disconnection. This facilitates easy replacement by the owner of the system as opposed to requiring a service call to a professional and also permits the recycling of the unit for repair or refurbishment.

FIG. 2 illustrates a cross sectional view of FIG. 1 along line A-A. In the exemplary embodiment shown, the electrolytic plates 120 are shown as solid plates. Further exemplary embodiments may utilize varying orientations and shapes for the electrolytic plates. Some non-limiting examples include horizontal stacking of the electrolytic plates, ovoid shaped plates, multiple stacks of rectangular or ovoid shaped electrolytic plates in both horizontal and longitudinal orientations, and similar shapes and orientations.

In the embodiment shown in FIG. 2, the flow valve 50 is located on the inlet or input side 150 of the housing 100. The electrolytic plates 120 are preceded by heat sink member 130. The electrolytic plates 120 are in electrical communication and the heat sink member 130 is in thermal communication with the electronics package 200. In the exemplary embodiment shown, an at least one sensor 310 is provided, in this case a flow sensor is shown extending from the upper compartment 190 and coupled to the microprocessor controller 240. The electronics package, in the exemplary embodiment shown, includes a series of LEDs 210, a push-button 215, microprocessor controller 240 and printed circuit board 250 that are encased in a waterproof potting material 270 in the electronics section 190 of the upper compartment 175. The push-button allows power to be turned on and off at the device, the LEDs 210 provide visual output of the operation of the device, the at least one sensor 310, here shown as flow sensor and a voltage sensor, detect a flow condition and communicates that condition to the controller 240. The controller 240 activates the electrolytic plates 120 and the inputs from the sensors also signal the at least one LED 210 as an indicator of the operation and operational capacity of the electrolytic plates as measured by the results of the measurements communicated by the flow and voltage sensors.

Figure 3:
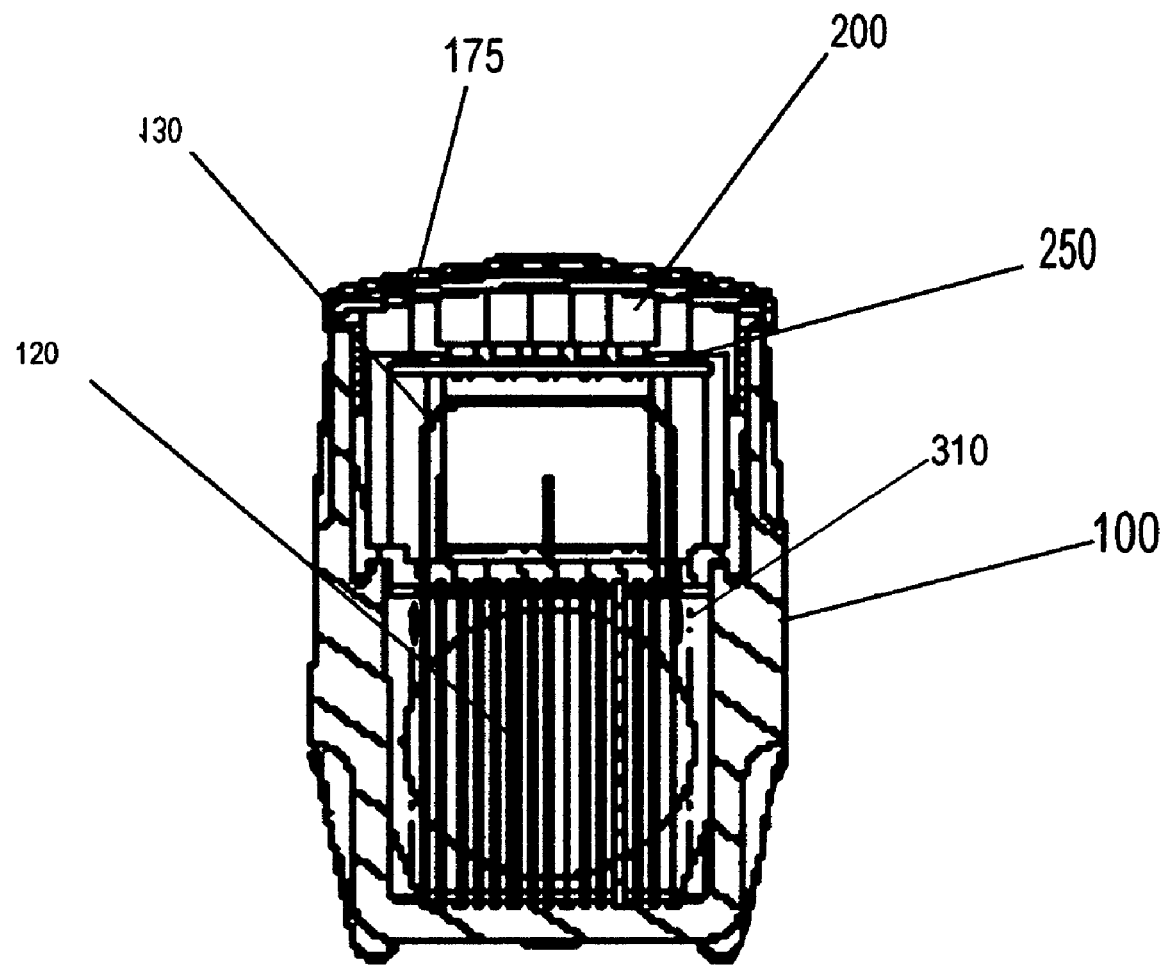
FIG. 3 illustrates a cross-sectional view of the exemplary embodiment of FIG. 1A along line B-B.

FIG. 3 illustrates a cross-sectional view of FIG. 1 along line B-B. Again, the exemplary embodiment shows an inlet 150 and an outlet side 170 of an exemplary embodiment of the chlorinator of the instant invention. The exemplary embodiment includes a housing 100 with an upper compartment 110. The upper compartment contains the control package 200, as discussed above in relation to FIG. 2. The electrolytic plates 120 are shown in a longitudinal configuration. In the embodiment shown in FIG. 3 the at least one sensor 310 is also included. In this instance the at least one sensor 310 includes a flow sensor and also two voltage sensors that are shown on the ends of the stacks of electrolytic plates 120. The heat sink member 130 is shown preceding and extending around the outermost plates in the electrolytic plate 120 stack. The electrolytic plates 120 are in electrical communication and the heat sink 130 is in thermal communication with the controller unit 200.

Figure 4:
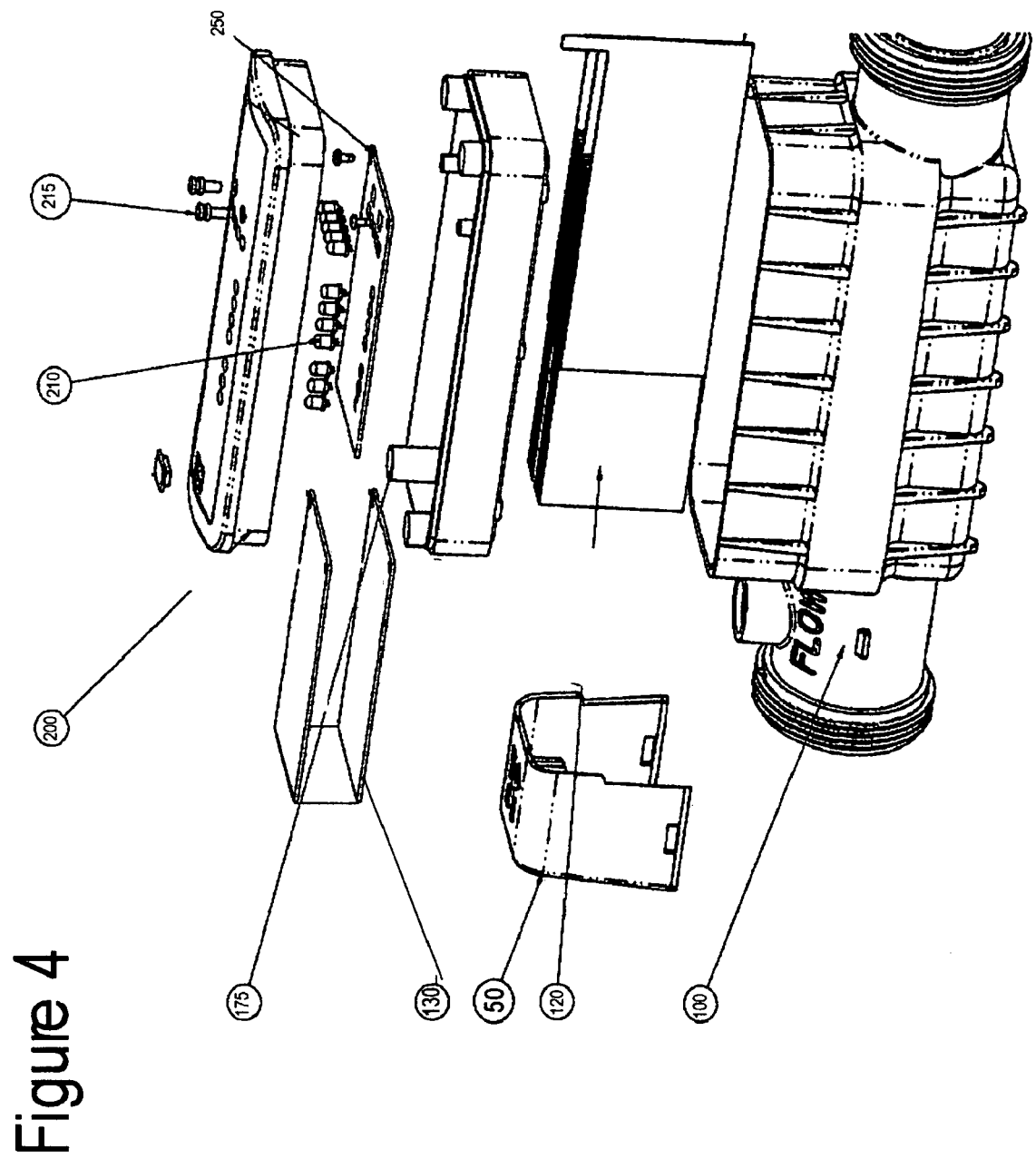
FIG. 4 illustrates an exploded view of a further exemplary embodiment of the instant invention.
Figure 5:
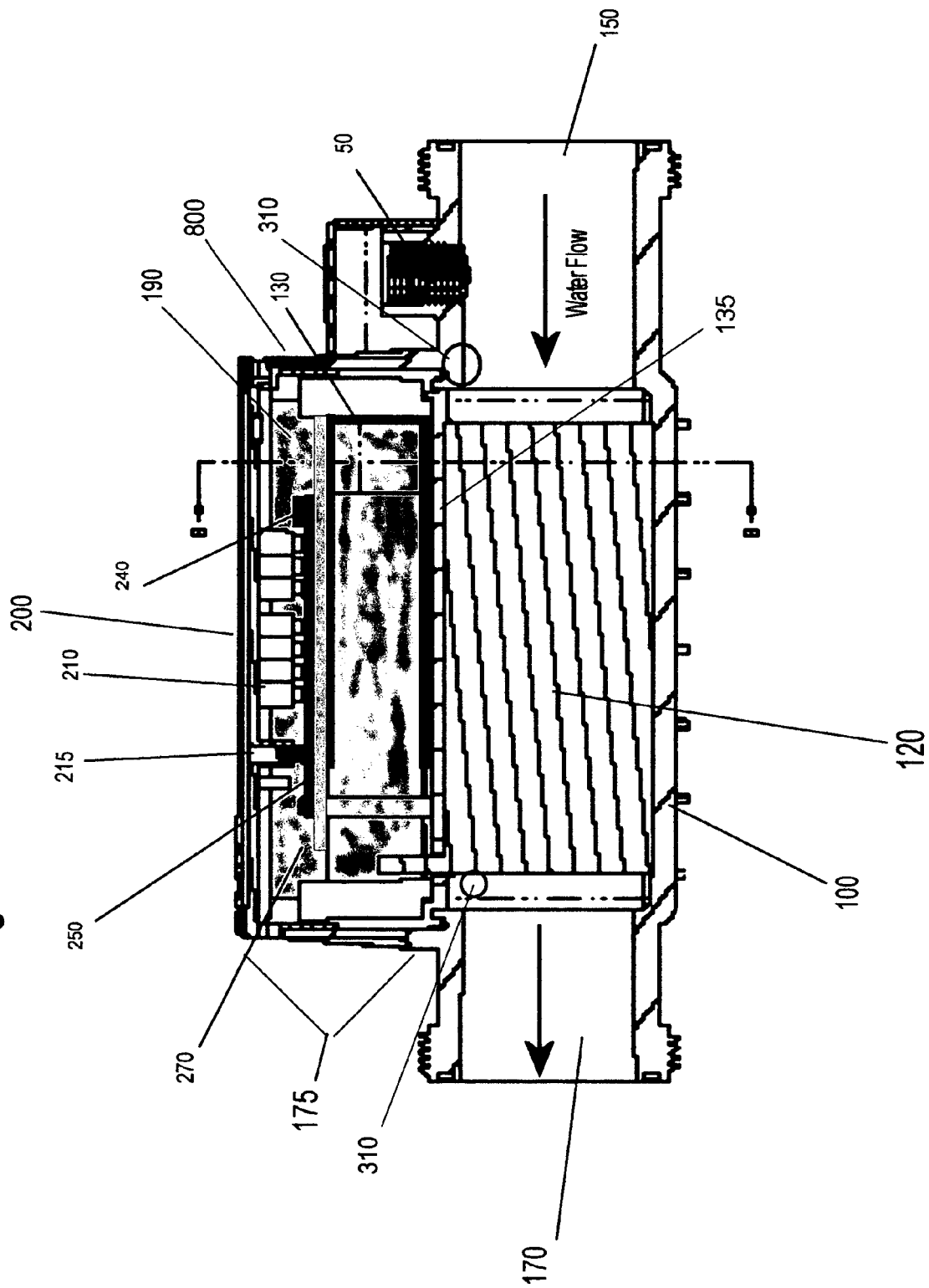
FIG. 5 shows a cross-sectional view of the further exemplary embodiment of FIG. 4 along line A-A.

FIG. 4 illustrates an exploded view of a further exemplary embodiment of the instant invention and FIG. 5 shows a cross-sectional view of the further exemplary embodiment of FIG. 4 along line A-A. The system is similar in all respects to that of the other figures save that the heat sink member 130 is secured along a separation section 135, in this case a concomitant section of the wall of the electronics compartment 190 that extends along the inlet section 150 side of the housing 100. The separation section 135 can be or include a further section of housing, a specially thinned section of housing, a thin film member or a further epoxy cover or similar protective barrier separating the heat sink member 130 from direct contact with the water. The removal of the heat sink member 130 from direct contact with the high salt water improves the longevity of the exemplary embodiment depicted. The remaining space around the heat sink member 130 in the electronics section 190 and the upper section 175 of the housing 100 can be further potted in a thermally conductive potting material 270, for instance a thermally conductive potting epoxy, shown in grey in the figures. The material further aids the heat sink member 130 in carrying away the heat of the controller 240.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A chlorinator mounted inline in a swimming pool water purification system, comprising:
    a housing having an inlet end and an outlet end in communication with the swimming pool bringing water from the pool through the inlet end and back to the pool from the outlet end and an upper compartment having an electronics section;
    a controller unit contained within the electronics section, the controller unit being electrically coupled to a power source and an at least one electrolyte plate; and
    a heat sink member in thermal communication with the controller, wherein the flow of the water in the swimming pool water purification system cools the heat sink member, the controller unit, and the electronics section, wherein the heat sink is separated from the water coming in the inlet end by a separation section, the separation section being a concurrent wall of the electronics compartment and the housing in direct contact with the water coming from the pool at the inlet end, the separation section being in direct contact with the heat sink and both the heat sink and the separation section being continually cooled by the water flowing in through the inlet end of the housing.

2. The inline chlorinator of claim 1, wherein the controller unit further comprises a microprocessor controller.

3. The inline chlorinator of claim of claim 2, further comprising an at least one sensor in communication with the microprocessor controller.

4. The inline chlorinator of claim 3, wherein the at least one sensor further comprises a flow sensor.

5. The inline chlorinator of claim 4, wherein the flow sensor is mounted within the chlorinator.

6. The inline chlorinator of claim 2, wherein the at least one sensor further comprises an electric potential sensor.

7. The inline chlorinator of claim 6, wherein the electrical potential sensor measures the electrical potential across the at least one electrolytic plate and communicates the result to the controller unit.

8. The inline chlorinator of claim 7, wherein upon detection of a threshold electrical potential input from an at least one electrical potential sensor, a voltage reversing circuit is engaged and the polarity of the plates reversed to reduce buildup.

9. The inline chlorinator of claim 2, wherein the controller unit further comprises an at least one of an at least one network interface and a data media.

10. The inline chlorinator of claim 9, wherein the at least one network interface and a data media store or store and transmit data from the sensors.

11. The inline chlorinator of claim 9, wherein the controller tracks and stores at least one of system operating parameters and historic data, including an at least one of the hours of use, the hours in each of a plurality of settings, the hours at various system conditions, and the number of self-clean cycles.

12. The inline chlorinator of claim 9, wherein the at least one of system operating parameters and historic data are transferred out of the controller into a storage medium using an at least one of a hand-held optical transmission device, a wired communication device, and a wirelessly connected device.

13. The inline chlorinator of claim 9, further comprising a means to transfer historic data from the chlorinator to a storage media or a display device through at least one of an optical transmission, wired, wireless, RF, and magnetic mechanism.

14. The inline chlorinator of claim of claim 1, wherein the electronics section is filled with a waterproof potting material without interrupting the thermal or electrical communication with the controller unit.

15. The inline chlorinator of claim 14, wherein the waterproof potting material is a two-part epoxy.

16. The inline chlorinator of claim 14, the heat sink further comprising a heat transmissive epoxy that also further acts as the potting epoxy.

17. The inline chlorinator of claim 1, wherein the controller unit further comprises a printed circuit board and a microprocessor controller.

18. The inline chlorinator of claim 17, wherein the controller is a stand-alone controller incorporated in a unitary, sealed housing.

19. The inline chlorinator of claim 18, wherein the stand-alone controller reports to and is further controlled by a master controller.

20. The inline chlorinator of claim 1, wherein controller unit further comprises at least one of an at least one LED and an at least one user interfaceable switch.

21. The inline chlorinator of claim 20, further comprising a user interface panel, wherein the at least one LED further comprises a plurality of LEDs as a part of the user interface, the user interface indicating a condition of the inline chlorinator.

22. The inline chlorinator of claim 1, wherein said heat sink in direct contact with the water flowing through the inlet.

23. The inline chlorinator of claim 1, wherein the heat sink is in close proximity to the inflow water.

* * * * *